under the United States Patent Office heading:

3,146,076
PREPARING SORPTIVE SILICEOUS PARTICLES
Gerhardt Talvenheimo, Brookhaven, Chester, Pa., assignor to Air Products and Chemicals, Inc., a corporation of Delaware
No Drawing. Filed July 22, 1960, Ser. No. 44,578
2 Claims. (Cl. 34—36)

This inventon is concerned with the manufacture of microporous particles suitable for use as desiccants, catalyst supports and/or for other purposes for which sorptive silica gel particles have been employed.

Manufacturers of sorptive refractory particles (e.g., silica gel, silica-alumina, titania gel, etc.) have distinguished between methods in which the initial hydrosol is prepared from solutions and methods in which the initial hydrosol is prepared from mixtures comprising suspended powder. As explained in Miller et al. U.S. 1,672,268, the fines resulting from imperfect sorptive particles may be admixed with sodium silicate solutions and/or acid prior to the preparation of a hydrosol. As explained in a series of patents including Shabaker U.S. 2,433,869 and Lebeis 2,665,258, advantages are achieved by controlling the particle size of the powder employed in the hydrosol mixture. Various procedures have been proposed for shaping the sorptive particles and the method generally known as bead-forming involves the introduction of aqueous solutions to form a hydrosol which sets to a hydrogel while a globule of the hydrosol is falling otherwise unconfined through a bath of liquid which is not miscible with the hydrosol. Such use of an oil bath to prepare approximately spherical material particles of sorptive inorganic material is described in Milliken et al. U.S. 2,588,402 and Lebeis U.S. 2,665,258. Methods of preparing sorptive silica beads from powder-containing silica hydrosol are set forth in the application of David W. Koester, Serial No. 812,109, filed May 11, 1959, for "Catalyst on Silica Support," and now abandoned.

In the conventional manufacture of sorptive inorganic particles, the removal of water from the hydrogel particles is sometimes described as requiring a preliminary drying stage and a subsequent dehydration stage. In the first stage of water removal, sufficient water is removed from the particles to overcome most of the tendency of the particles to adhere to each other. In the second stage of water removal, the thus dried particles (containing more water than potentially refractory material) are subjected to a dehydration step at an elevated temperature to reduce the combined water content to less than about 33% of the weight of the particle.

In removing water from a hydrogel particle to prepare a sorptive particle of great mechanical strength, some of the particles are broken, and the dehydration procedures must be evaluated with emphasis upon the proportion of whole unbroken particles thus prepared. Some sorptive particles are broken when immersed in water, and the immersion shock resistance of the sorptive particles must be considered in evaluating dehydration procedures. The time required for removing water to convert a hydrogel particle to a porous refractory is sometimes of controlling importance in the selection of the water removal procedure, inasmuch as the cost per pound of porous refractory is dependent in part upon the necessary duration of the dehydration treatment. For engineering reasons, the quickest treatment achieving a satisfactory yield of whole unbroken particles able to withstand the shock of immersion in water has been desired, and this has sometimes required the withdrawal of water in stages conducted at different conditions over a period of fifteen hours.

In accordance with the present invention, the removal of water from siliceous particles is accomplished by passing through the particles a gas stream containing both ammonia and steam, whereby the dehydrated particles possess properties superior to those of particles prepared by water removal in the absence of ammonia and whereby commercially acceptable yields of particles which are not fractured when subjected to the shock of immersion in water are produced during a dehydration period significantly shorter than possible in the absence of ammonia. For example, the use of the ammonia permits the conversion of the hydrogel particles into microporous refractory particles during a period from about 2 to about 6 hours. Control procedures omitting the ammonia from the gas stream employed to remove the water are less satisfactory because of the longer time, greater breakage, and/or poorer resistance to water immersion shock. Moreover, the density, surface area, distribution of pore diameters, and/or a group including other properties of the ammonia-dried particles are generally more advantageous than those of particles prepared by a similar procedure in the absence of ammonia.

The nature of the invention is further clarified by reference to a plurality of sets of data pertinent to procedures of the type with which the present invention is concerned.

EXAMPLE I

Powder-included silica gel beads are prepared by reacting sulfuric acid with an aqueous mixture of sodium silicate and silica gel powder to form a siliceous sol, which is allowed to harden into gelatinous globules while falling through an oil bath. The thus prepared gelatinous beads of silica gel are first wet processed to remove salts and then are subjected to four different types of dehydration treatment. In the first control, the bed of silica beads is maintained at a temperature of about 930° F. for about three hours by passage therethrough of a clean air stream. In the second control, sufficient steam is introduced into the dehydration gas to provide the amount of moisture that would be introduced in saturating the gas stream at about 70° F. In a third preparation, the circulating air was saturated with an aqueous solution containing sufficient ammonium hydroxide to correspond to about 28% ammonia.

In a fourth preparation, the air at about room temperature, that is, at about 70° F., was contacted with an aqueous solution containing about 99% water and about 1% ammonium hydroxide, thus saturating the gas with water vapor at 70° F. (as in the 2nd and 3rd preparations) but adding only a minor amount of ammonia. The results of the several treatments are set forth in Table 1.

The standard proceduce for measuring water absorbency involves weighing before and after immersion and draining of a sample of particles. The average pore diameter in meters is calculated by dividing the cubic meters of water absorbed per gram by one-fourth of the square meters of surface area per gram, and the volume percent porosity is similarly derived by multiplying the weight percentage of water absorbency by the specific gravity of the pellet.

Table 1

| Treatment | Area, m.²/g. | Vol. Percent Porosity | Wt. Percent H₂O Adsorption | Pellet Density | Avg. Pore Diam., A. |
|---|---|---|---|---|---|
| Air-flow, 70–930° F./3 hr | 658 | 49.8 | 46.7 | 1.06 | 28 |
| H₂O Sat'd air, 70–900° F./3 hr | 719 | 53.4 | 50.6 | 1.05 | 28 |
| Air through 28% NH₄OH Sol'n., 70–930° F./3 hr | 292 | 67.3 | 92.3 | 0.73 | 126 |
| Air through 1% NH₄OH, 70–880° F./3 hr | 381 | 68.1 | 96.4 | 0.70 | 101 |

The dry air treatment of the preparation provided the highest density particles. However, most of the particles spalled, and only a small fraction of whole beads were obtained. The moist air treatment of the second preparation resulted in an increased surface area but an average pore diameter substantially the same as obtained from the dry air treatment. Moreover, only a few whole beads were obtained and troublesome spalling was noticeable. Especially good results, including an average pore diameter of 126 angstroms, were achieved by the use of a gas stream saturated with about 28% aqueous ammonia in the third preparation, involving the recovery of most of the beads as whole beads. Although only 1% ammonia was employed in the solution employed to saturate the air in the fourth preparation, still the average pore diameter was 101 angstroms, or 361% of the pore diameter obtained in the second preparation, which differed merely in the absence of said 1% ammonia. Moreover, spalling was substantially eliminated, whereby large yields of whole beads were obtained in the presence of ammonia.

EXAMPLE II

In order to obtain the desired conversion from a globule of hydrosol to a firm hydrogel bead during the short period of time during the fall through the oil bath, the hydrosol should be alkaline at a pH within the range from about pH 8 to about pH 11, and the proportions of acidic mixture and aqueous siliceous mixture must be controlled to achieve this objective. The hydrosol globules consist of 2% silica powder having a particle size within the range from 1 to 20 microns and an average particle size within the range from 5 to 15 microns, 8% silica derived from the sodium silicate, sufficient sulfuric acid to provide the desired pH, and about 2.5% sodium oxide derived from the sodium silicate and converted predominantly to sodium sulfate. The thus prepared hydrogel beads were transferred to an aqueous solution containing 4% phosphoric acid for several hours aging treatment, and were then water-washed several times to remove much of the sodium sulfate and sodium phosphate therefrom, and to provide siliceous beads having a pH of about 7.5. The thus desalted beads were then subjected to a more severe aging in aqueous acid containing about 90% water and about 10% acid. Surprisingly identical results were obtained in several parallel preparations with the only variation in the numerous steps between hydrosol formulation and evaluation of the calcined silica gel bead was the variation in the choice of acid for the severe aging in acid. The sorptive silica gel beads had remarkably low bulk density. Data relating to some of the silica beads are shown in Table 2.

Table 2

| Sample No. | Vol. percent Por. | Wt. percent H₂O Abs. | Pellet Density | Bulk Density | S.A., m.²/g. | Avg. P.D., A. |
|---|---|---|---|---|---|---|
| 1 | 68.6 | 100.6 | 0.679 | 0.446 | 311 | 130 |
| 2 | 74.0 | 128.0 | 0.576 | 0.374 | 368 | 139 |
| 3 | 66.4 | 88.9 | 0.744 | 0.468 | 164 | 162 |

Advantages are obtained in employing silica gel beads having combinations of properties such as shown. All three varieties were prepared as described followed by acidification, drying for 2 hours at 300° F. and dehydration in a gas stream consisting of about 25% NH₃ and 75% H₂O at temperatures increasing to at least 1000° F. Sample No. 1 was acidified for 2 hours in cold 40% HCO₂H. Sample No. 2 was acidified first in 4% H₃PO₄ for 6 hours, then water-washed, then treated with 6% H₃CCO₂H for 2 hours, then water-washed, and then treated with 40% HCO₂H for 2 hours. The hydrogel beads of Sample No. 3 were immersed for 6 hours in 4% H₃PO₄, washed, and acidified for 2 hours in 6% acetic acid, washed, and thereafter dehydrated for 8 hours during a portion of which the stream of ammonia and steam was at 1600° F., thereby reducing the surface area and enlarging the average pore diameter in comparison with particles dehydrated only at lower temperatures.

In a control procedure, the beads were prepared by a method almost the same as that employed in preparing said Sample 3, the only difference being the omission of the ammonia while preparing Sample 4. When ammonia was employed, the average pore diameter was about 30% smaller and the surface area was about 12.3% larger than when ammonia was omitted, as indicated in Table 3.

Table 3

| Sample No. | Vol. percent Por. | Wt. percent H₂O Abs. | Pellet Density | S.A., m.²/g. | Avg. P.D., A. |
|---|---|---|---|---|---|
| 3 | 66.4 | 88.9 | 0.744 | 164 | 162 |
| 4 | 65.2 | 85.1 | 0.763 | 146 | 233 |

From these and other data it was established that the presence of ammonia in the stream for dehydrating such silica hydrogel beads not only permitted faster dehydration with a smaller proportion of broken beads and a smaller proportion of beads fractured when subjected to immersion shock but also permitted the attainment of dehydrated silica gel beads having a superior combination of properties.

Obviously many modifications and variations of the invention as hereinbefore set forth may be made without departing from the spirit and scope thereof, and therefore only such limitations should be imposed as are indicated in the appended claims.

What is claimed is:

1. A method of converting wet siliceous particles consisting predominantly of water, most of the solids content of the particles being silica, into dehydrated high surface area siliceous particles containing less than 33% water and having a size predetermined by the size of the wet siliceous particles which method consists essentially of the steps of: directing a gas stream through a heating zone to provide a preheated gas stream, said preheated gas stream consisting essentially of air, steam, and ammonia, and said gas stream resulting from the saturation of air with the vapors from aqueous ammonium hydroxide; passing through a bed of siliceous particles consisting initially predominantly of water, most of the solids content of the particles being silica, said preheated gas stream containing ammonia and steam, thereby bringing about the dehydration of the particles; continuing such passage of the preheated, ammonia-containing gas for about three hours during at least two hours of which the bed of particles is maintained by such preheated gas at a temperature within the range from 850 to 1050° F.; and withdrawing from the bed crush-resistant siliceous particles, a significantly higher proportion being of said predetermined size than in a similar method omitting the ammonia during the dehydration of the particles.

2. The method of converting a bed of siliceous particles consisting predominantly of water, most of the solids content of the particles being silica, to attrition-resistant, crush-resistant siliceous particles containing less than 33% water, which method consists of passing through said bed of the siliceous particles for a period of about three hours a hot gas stream consisting essentially of air, steam and ammonia, said gas stream being at about atmospheric pressure and resulting from the saturation of air with the vapors from aqueous ammonium hydroxide at about 70° F. and the heating of the gas stream to a temperature within the range from about 830° F. to about 1000° F., and withdrawing as a product of the process siliceous particles having a resistance to temperature shock and a resistance to water immersion shock significantly superior to the properties of particles produced under otherwise equivalent conditions in the absence of ammonia.

References Cited in the file of this patent

UNITED STATES PATENTS

| | | |
|---|---|---|
| 1,755,496 | Behrman | Apr. 22, 1930 |
| 2,746,935 | Weisz | May 22, 1956 |